US010354603B2

(12) United States Patent
Ross et al.

(10) Patent No.: US 10,354,603 B2
(45) Date of Patent: Jul. 16, 2019

(54) COMPUTER DISPLAY SCREEN FOR CONCUSSION PATIENTS

(71) Applicant: Iris Technological Design Incorporated, Kingston (CA)

(72) Inventors: Conor G. Ross, Toronto (CA); Colin S. D. Harding, Mississauga (CA)

(73) Assignee: Iris Technological Design Incorporated, Kingston, ON (CA)

( * ) Notice: Subject to any disclaimer, the term of this patent is extended or adjusted under 35 U.S.C. 154(b) by 0 days.

(21) Appl. No.: 15/616,436

(22) Filed: Jun. 7, 2017

(65) Prior Publication Data

US 2017/0358256 A1 Dec. 14, 2017

Related U.S. Application Data

(60) Provisional application No. 62/347,201, filed on Jun. 8, 2016.

(51) Int. Cl.
*G09G 3/20* (2006.01)
*G09G 3/34* (2006.01)
(Continued)

(52) U.S. Cl.
CPC .......... *G09G 3/3611* (2013.01); *G06F 3/14* (2013.01); *G05B 2219/45109* (2013.01);
(Continued)

(58) Field of Classification Search
None
See application file for complete search history.

(56) References Cited

U.S. PATENT DOCUMENTS

2007/0273708 A1* 11/2007 Andreasson .......... G06T 11/001
345/593
2008/0204471 A1* 8/2008 Jaeger .................. G06F 3/0481
345/594
(Continued)

FOREIGN PATENT DOCUMENTS

CN      101727836 A      6/2010
CN      101996546 A      3/2011
(Continued)

OTHER PUBLICATIONS

Amy, C.G. "Fox 9 meteorologist Ian Leonard returning to work after concussion", Saint Paul Pioneer Press (Dec. 5, 2013). Retrieved from: http://search.proquest.com/docview/1465561485?accountid=14771.
(Continued)

*Primary Examiner* — Tize Ma
(74) *Attorney, Agent, or Firm* — Stephen J. Scribner

(57) ABSTRACT

Provided are display screens for electronic devices and methods for displaying content on electronic devices, that are particularly suitable for users who are suffering from or recovering from a concussion or mild traumatic brain injury (MTBI), migraine, or computer vision syndrome. Embodiments comprise a component that modifies at least one parameter of content that is displayed on the display screen, wherein the modified displayed content reduces, minimizes, or eliminates negative side effects of users. Embodiments may include computer executable programmed instructions stored on a non-transitory computer readable storage medium that direct a processor to modify at least one parameter of content that is displayed on a display screen of an electronic device, and/or to implement a simplified graphical user interface. One embodiment is implemented using an e-paper display screen.

18 Claims, 3 Drawing Sheets

(51) Int. Cl.
*G09G 3/36* (2006.01)
*G06F 3/14* (2006.01)

(52) U.S. Cl.
CPC ........... *G09G 2320/0247* (2013.01); *G09G 2320/066* (2013.01); *G09G 2320/0666* (2013.01); *G09G 2330/026* (2013.01); *G09G 2354/00* (2013.01); *G09G 2370/022* (2013.01); *G09G 2380/08* (2013.01); *G09G 2380/14* (2013.01)

(56) References Cited

U.S. PATENT DOCUMENTS

2008/0303782 A1* 12/2008 Grant .................. G06F 1/1615
345/156
2016/0078846 A1* 3/2016 Liu ......................... G09G 5/18
345/212

FOREIGN PATENT DOCUMENTS

| | | |
|---|---|---|
| CN | 104123917 A | 10/2014 |
| WO | WO2014/049425 A1 | 4/2014 |

OTHER PUBLICATIONS

Barnett, B.P., et al. "Vision concerns after mild traumatic brain injury", Current Treatment Options in Neurology 17(5) (2015).

Chang, T.T., et al., "Criticai flicker frequency and related symptoms in mild traumatic brain injury", Brain injury 21(10): 1055-1062 (2007).

Harmon, K., et al., "American Medical Society for Sports Medicine position statement: concussion in sport", British Journal of Sports Medicine 47:15-26 (2013).

Patel, R., et al., "Elevated coherent motion thresholds in mild traumatic brain injury", Optometry 82(5):284-289 (2011).

Schrupp, L., et al., "Foveal versus eccentric retinal critical flicker frequency in mild traumatic brain injury", Optometry 80(11): 642-650 (2009).

Tator, C.H. "Concussions and their consequences: Current diagnosis, management and prevention", Canadian Medical Association Journal 185(11): 975-979 (2013).

Wimalasundera, S. "Computer vision syndrome", Galle Medical Journal 11(1): 25-29 (2006).

Dasung Paperlike the World's First E Ink Monitor Relax Your Eyes, Retrieved from: http://www.dasung/com/english/.

* cited by examiner

COMPUTER DISPLAY SCREEN FOR CONCUSSION PATIENTS

RELATED APPLICATION

This application claims the benefit of the filing date of Application No. 62/347,201, filed Jun. 8, 2016, the contents of which are incorporated herein by reference in their entirety.

FIELD

This invention relates to apparatus and methods that enable or enhance electronic device use by individuals during recovery from a concussion or mild traumatic brain injury, i.e., a concussion patient, or individuals that suffer from migraine or computer vision syndrome. The invention includes methods for modifying content what would normally appear on a screen of the electronic device, and presenting the modified content on the display screen such that the experience of concussion patient or individual that suffers from migraine or computer vision syndrome is improved or enhanced. In one embodiment, the invention relates to a display screen for an electronic device that employs e-paper technology.

BACKGROUND

Current guidelines for mild traumatic brain injury (e.g., concussion) recovery are unclear and minimal. Health professionals may recommend avoiding stimuli by avoiding bright lights. There is no current method or prescription to improve recovery times of concussion patients.

During the recovery process, concussion patients find themselves unable to do many tasks that were previously part of their daily life. Health professionals largely advise patients with concussions, especially those exhibiting photophobia, to avoid looking at liquid crystal display (LCD) screens, since these particular screens may exacerbate symptoms and thereby interfere with the recovery process (Amy, 2013; Tator, 2013). However, computers with LCD screens are a widely used platform for daily communication and are often a required technology in work-places; hence, finding ways to improve computer tolerance in this population will not only prevent social isolation and associated depression, but may facilitate earlier return-to-work in workplaces that require computer use.

LCD computer screens refresh (or flicker) at a rate of 60 times per second. This is tolerable for a healthy individual, but an individual who has had a concussion and suffers from photosensitivity, a common symptom, has a lower critical flicker frequency (CFF) tolerance when compared to those who do not suffer from photosensitivity (Chang et al., 2007; Schrupp et al., 2009). The backlighting typical of an LCD screen may also stress individuals who experience photosensitivity and can cause cognitive fatigue, headache, and eye fatigue (Barnett et al., 2015). Flashing and motion can make individuals recovering from a concussion nauseated and can delay their recovery (Patel et al., 2011).

SUMMARY

Described herein is a display screen for an electronic device, comprising: a component that modifies at least one parameter of content that is displayed on the display screen; wherein the displayed content with at least one parameter that is modified reduces, minimizes, or eliminates negative side effects in a user viewing the display screen; wherein the user suffers from or is recovering from a condition associated with the at least one negative side effect. The condition may be migraine, eyestrain, computer vision syndrome (CVS), concussion, or mild traumatic brain injury (MTBI).

In one embodiment the component comprises computer executable programmed instructions stored on a non-transitory computer readable storage medium; wherein the programmed instructions direct a processor to modify the at least one parameter of the content that is displayed. The component may further comprise the processor.

In one embodiment the component modifies at least one parameter so that content is displayed in black-and-white, in a grey scale, with enhanced contrast, without video or animation, in one font size, or in one font style, or a combination of two or more thereof. In one embodiment the component implements a graphical user interface (GUI) on the display screen.

The display screen may be configured to fit over or in front of an existing screen of the electronic device; wherein the existing screen is covered by the display screen. In one embodiment the display screen is configured to slide over an existing screen of the electronic device, or to removably attach to the existing screen using clips or other fasteners.

In one embodiment the display screen comprises e-paper technology.

Also described herein is computer executable programmed instructions stored on a non-transitory computer readable storage medium; wherein the programmed instructions direct a processor to modify at least one parameter of content that is displayed on a display screen of an electronic device; wherein the processor is directed to perform one or more operations selected from receiving the content to be displayed, analyzing the content, detecting one or more properties of the content (such as colour, video information, text size, text style), modifying the one or more properties, and outputting the content to be displayed on the display screen; wherein the displayed content reduces, minimizes, or eliminates at least one negative side effect in a user suffering from or recovering from migraine, eyestrain, computer vision syndrome (CVS), concussion, or mild traumatic brain injury. The programmed instructions may include instructions for presenting the content on a display screen comprising e-paper technology. In one embodiment the programmed instructions include instructions to display the content on the display screen using a graphical user interface.

Also described herein is a method for displaying content on an electronic device, comprising: modifying at least one parameter of the content that is displayed on a display screen; wherein the modifying at least one parameter of the content reduces, minimizes, or eliminates a negative side effect in a user viewing the display screen; wherein the user is suffering from or recovering from migraine, eyestrain, computer vision syndrome (CVS), concussion, or mild traumatic brain injury.

Also described herein is a method for modifying content for display on a screen of an electronic device, and presenting the modified content on a secondary display screen such that the experience of a concussion patient or an individual that suffers from migraine or computer vision syndrome is improved or enhanced. In one embodiment, the secondary display screen employs e-paper technology.

The methods may comprise modifying at least one parameter so that content is displayed in black-and-white, in a grey scale, with enhanced contrast, without video or animation, in one font size, or in one font style, or a combination of two or more thereof. The methods may comprise displaying modified content on the display screen using a graphical user interface. The methods may comprise controlling a refresh rate of the display screen to be 30 frames per second or less.

The methods may include using a display screen comprising e-paper technology.

According to the embodiments, the negative side effect that is reduced, minimized, or eliminated comprises one or more of cognitive fatigue, headache, migraine, eye fatigue, nausea, vomiting, photophobia, photosensitivity, dizziness, confusion, mental fatigue, physical fatigue, drowsiness, a vision problem, depression, anxiety, and irritability.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
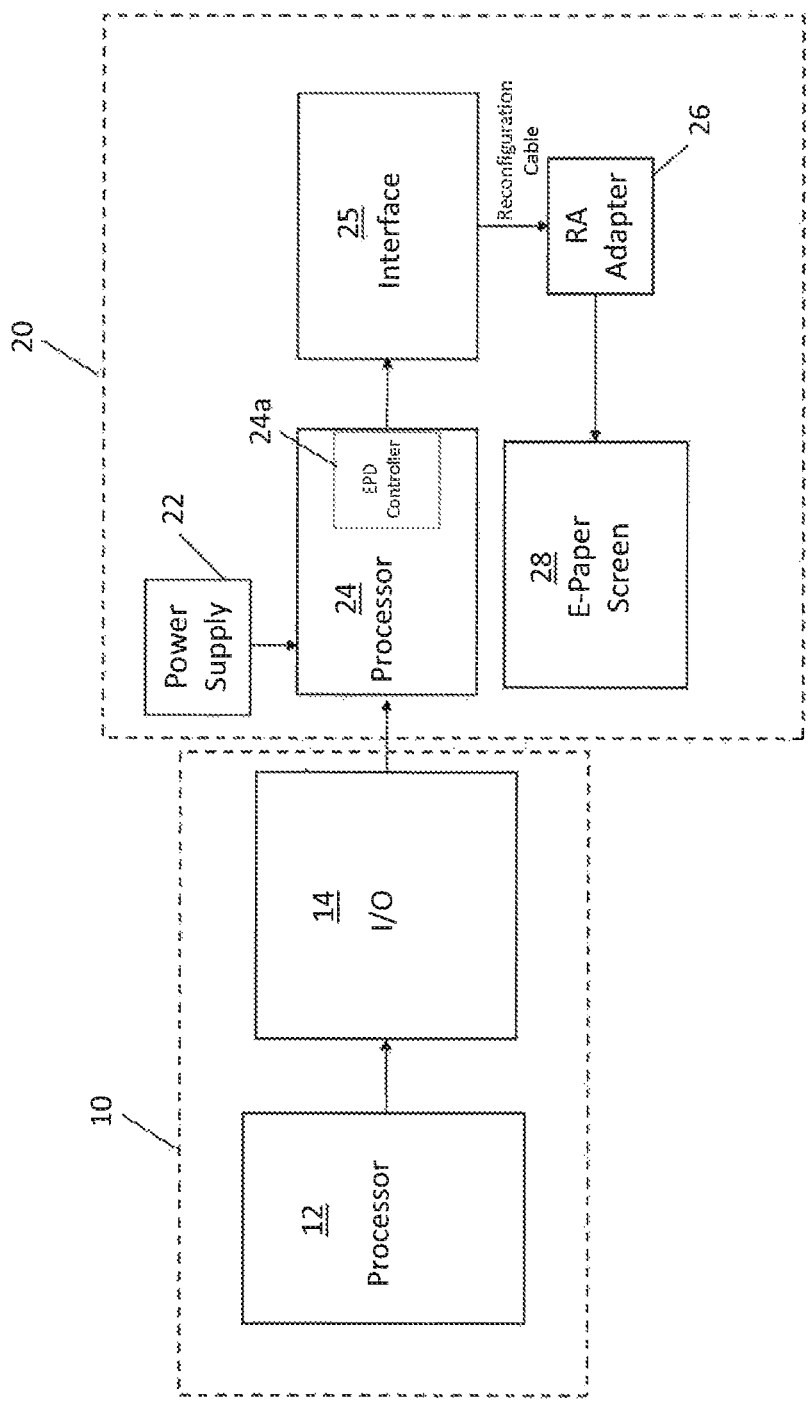
FIG. 1 is a block diagram of an e-paper display screen apparatus, according to one embodiment.

Given that LCD screens, associated with electronic devices such as computers, are ubiquitous in both the workplace and at home, the livelihoods of many individuals suffering from and/or recovering from a condition that affects their ability to use such devices for more than a short period are negatively impacted. Examples of such a condition include, but are not limited to, migraine, computer vision syndrome (CVS), mild traumatic brain injury (TBI) (e.g., concussion), and post concussive syndrome. A person suffering from TBI and/or post concussive syndrome is generally referred to herein as a concussion patient. The embodiments described herein address the needs of such individuals by providing display screens that enable prolonged periods of use with reduced, minimal, or no negative side effects. Improving computer tolerance in patients suffering from post concussion syndrome and other conditions may facilitate an earlier return to work in workplaces requiring computer use, earlier return to school for students and student-athletes requiring computer use for educational purposes, and will help patients perform daily tasks requiring computers, preventing social isolation and associated depression.

Although it is generally agreed that concussions are a subset of mild traumatic brain injury (see, e.g., Harmon et al., 2013), the terms "mild traumatic brain injury" or "MTBI" and "concussion" are used interchangeably herein. The embodiments described herein are applicable to individuals suffering from or recovering from MTBIs and concussions.

As used herein, the term "negative side effect" refers to, but is not limited to, an undesirable physiological response or symptom exhibited by an individual, such as a concussion patient, or a person that suffers from migraine or CVS, during or after viewing a LCD screen. The negative side effect may be triggered by or exacerbated by use of a LCD screen. The negative side effect may include one or more of cognitive fatigue, headache, migraine, eye fatigue, nausea, vomiting, photophobia, photosensitivity, dizziness, confusion, mental fatigue, physical fatigue, drowsiness, a vision problem, depression, anxiety, and irritability. Such negative side effects may also be referred to herein as "post-concussion symptoms", in respect of concussion patients.

As used herein, the term "electronic device" refers to, but is not limited to, a computer (e.g., a laptop or desktop computer or a computer workstation), a personal electronic device such as a personal digital assistant (PDA) or a cell phone, or a gaming device. The term "computer" as used herein will be understood to refer generally to all such electronic devices.

An LCD screen is currently the most common visual display for electronic devices. Other electronic visual displays based on plasma and LED technologies render content in a manner similar to an LCD screen, and thus also cause the same negative side effects. Embodiments described herein may be used in place of all other such visual displays, to reduce, minimize, or eliminate one or more negative side effects experienced by a concussion patient or a person that suffers from migraines or CVS.

In one embodiment the display screen is a substitute or secondary display screen (e.g., a computer monitor) for an electronic device that connects to the electronic device using a cable with suitable electrical connectors (e.g., USB, VGA, HDMI, DisplayPort, or others as known in the art). Advantageously, the display screen may be at least as large as the screen of the device to which it is being connected, which alleviates eye strain and reduces post-concussion symptoms of the user. In one embodiment the substitute display screen is configured to fit over (i.e., in front of) the existing screen of the electronic device, such that the existing screen is covered by the substitute display screen. For example, the substitute display screen may be configured slide over the existing laptop screen, or to removably attach to the existing laptop screen using clips or other fasteners. In such embodiments, the substitute display screen displays content that would otherwise be displayed on the existing screen, but does so while minimizing, reducing, or eliminating symptoms experienced by a concussion patient. In other embodiments the display screen is incorporated into an electronic device during manufacturing. Accordingly, the patient's experience is enhanced, and the amount of time that the patient can spend using an electronic device such as a computer is significantly extended. In some cases, the embodiments enable computer use by concussion patients who could not use a computer with a LCD screen, due to the severity of symptoms induced by the LCD screen. Thus, the embodiments allow concussion patients to continue activities involving a computer (or other device) during recovery, without increasing their recovery time.

Embodiments achieve the above benefits by providing one or more features that enhance the user experience of a concussion patient. The expression "enhance the user experience of a concussion patient, or a person that suffers from migraines or CVS" means that a concussion patient, or a person that suffers from migraines or CVS, may experience fewer or reduced post-concussion symptoms, i.e., negative side effects, than when using a device with a LCD screen. One feature is a significantly reduced refresh rate (i.e., flicker rate) relative to that of a LCD screen. For example, one embodiment may have a refresh rate of 30 Hz (i.e., 30 frames per second (FPS)) or less. In one embodiment, one or more parameters of refreshing the display screen is adjustable. For example, adjustability may include setting when the display screen refreshes and how often. This may be set according to a health professional's recommendations, and/or according to what is found comfortable by the concussion patient or person that suffers from migraine or CVS. Setting a refreshing parameter may include setting a dynamic full refresh rate that reduces or eliminates effects such as ghosting. Furthermore, as the patient's recovery progresses, it may be desirable to adjust one or more refreshing parameters of the display screen. In one embodiment, the refresh rate is adjustable from 10 FPS to 30 FPS, although other ranges may be implemented. In on embodiment, local refreshing is implemented to allow the user to control refreshing, to minimize the changes on the screen and reduce strain on the eyes. For example, local refreshing may be implemented so that the display screen only refreshes pixels where content that has changed, while the rest of the pixels remain static. This minimizes movement on the display screen and is therefore more desirable for a user recovering from post-concussion syndrome, or a person that suffers from migraine or CVS.

In another embodiment reflective glare on the display screen is minimized through the use of selected screen materials and/or coatings. For example, an outer layer of the screen may include a glass or plastic material with a matt finish to reduce glare. Optionally, a polarized coating may be applied to an outer layer of the screen material to reduce glare. In particular, such embodiments may reduce one or more negative side effect experienced by individuals suffering from CVS (Wimalasundera, 2006). In another embodiment, content on the display screen may be viewed with ambient light, and under dim ambient light conditions, without the need for artificial light. The user may then adjust the amount of artificial light in their environment to their preference. Avoiding the need for artificial lighting helps to increase the length of time a patient can use a device such as a computer during recovery from a concussion by eliminating or reducing light-induced adverse effects of post concussion syndrome and migraine.

Another embodiment includes a feature that modifies one or more properties of content to be displayed on the screen so that the content conforms to certain parameters. The parameters are designed to reduce the number, intensity, size, etc., of stimuli that are triggers for the negative side effects described herein. For example, content may be modified by removing all colours, so that it is displayed in a substantially black-and-white format. In another example, content may be modified by removing all colours, so that it is displayed in a grey scale. The resolution of the grey scale (e.g., 4, 16 bit, etc.) may be adjustable. Some embodiments may allow the user to select a black-and-white or grey scale display. In another example, the content may be modified by improving contrast to increase visibility and makes font and text easier to read, and pictures and graphics more vivid. In another example, the content may be modified by removing all video (e.g., movies, animations) information, which can cause and trigger common symptoms experienced during concussion recovery. In another example, the content may be modified by removing images and advertisements, such as pop-ups, to reduce clutter and thereby simplify the presentation of content. In another example, the content may be modified by rendering all text in one or more font sizes that are selected to be large enough to avoid eye strain and associated symptoms in a concussion patient or a person suffering from migraine or CVS. In one embodiment, the font size is 14 point or larger. In one embodiment, all text is rendered congruently, i.e., in the same font size and style. In one embodiment, the font size is adjustable. In another example, the content may be modified by rendering all text in a font style that minimizes eye strain and associated symptoms in a concussion patient or a person suffering from migraine or CVS.

In one embodiment, a graphical user interface (GUI) is implemented with the display screen. The GUI presents content in a simplified graphical form, relative to complex GUIs typically used, that is preferable for concussion patients or persons suffering from migraine or CVS. For example, the GUI may be implemented as a tile or grid system to simplify the amount of information presented on the display screen. The GUI may eliminate the need for a mouse, thereby avoiding erratic cursor movements that can trigger negative side effects in a user recovering from a concussion or a person suffering from migraine or CVS. In one embodiment, the GUI is implemented using a touch screen, to eliminate the need for a mouse. A touch screen may be implemented using, e.g., capacitive film technology. Parameters of the GUI, such as the tile or grid size, the number of tiles, and their movements may be adjustable. Adjustments may be made based on a health professional's recommendations and/or patient preferences. The GUI may be used for controlling, monitoring, managing, and accessing the electronic device, and enables a user to choose commands, execute application programs, manage computer files, and perform other functions by selecting tiles or simple graphical representations, or items from a menu through use of an input device such as a mouse or a touch screen. A simplified GUI according to the embodiments may avoid features that can trigger a negative side effect in a user, such as small or complex "windows" and icons, overlapping and nested windows, moving windows, etc.

Embodiments may include computer executable programmed instructions (i.e., an algorithm) that perform one or more operations such as receiving the content to be displayed, analyzing the content, detecting one or more properties of the content, such as colour, video information, text size, and text style, removing or modifying the one or more properties as described above, and outputting the content to be rendered on the display screen. The programmed instructions may include a display driver for the display screen. In one embodiment the programmed instructions implement and/or control operation of a GUI. The programmed instructions may be embodied in one or more hardware modules or software modules resident in a memory device of the display screen, or loaded into the electronic device with which the display screen is used. In one embodiment the programmed instructions may be embodied on a non-transitory computer readable storage medium or product (e.g., a compact disk (CD), USB memory device, etc.) which may be used for transporting the programmed instructions to the electronic device and/or for executing the programmed instructions. In one embodiment the programmed instructions may be embedded in a computer-readable signal or signal-bearing medium (or product) that is uploaded to a network by a vendor or supplier of the programmed instructions, and this signal or signal-bearing medium may be downloaded through an interface to the electronic device from the network by end users or potential buyers.

It will be appreciated that a display screen as described herein may incorporate any of the aforementioned features in any combination. In one embodiment the display screen includes e-paper (also referred to as "e-ink") technology. An e-paper screen uses a magnetized polymer to create shapes on the display, which is different from the light modulating liquid crystals of an LCD screen. Also, unlike an LCD screen, an e-paper screen can be viewed in ambient light and does not require backlighting, and the image on an e-paper screen does not need constant refreshing. Since an e-paper screen is bi-stable, it is only refreshed when content on the screen changes, and it does not require power to hold an image. This, combined with the absence of a back light, results in very low power consumption. An e-paper screen may be provided in a size such as 9 inches, or larger, and is lightweight. With all of these features, e-paper is a good candidate for a display screen as described herein.

It will also be appreciated that the embodiments described herein provide a display screen that increases reading comprehension in a concussion patient or a person suffering from migraine or CVS by using congruent font styles and sizes which increase readability and therefore understanding and memory of the displayed content. The embodiments may enable faster reading times and longer attention span due to the reduction in cognitive strain and concentration effort, therefore reducing the amount of breaks required to read the displayed content. The embodiments may reduce eye movement required to view content by clearly displaying the content in black and white, with high contrast, and without backlighting. Since the backlighting of an LCD screen increases eye movement which can limit reading comprehension, the absence of a backlit screen reduces eye movement and increases reading comprehension of a concussion patient or a person suffering from migraine or CVS. The embodiments may reduce distraction in the displayed content by removing videos, animations, and colours. The embodiments may improve sleep in a concussion patient or a person suffering from migraine or CVS by reducing or eliminating artificial light that can induce effects similar to those caused by sunlight.

Embodiments will be further described by way of the following non-limiting Examples,

Example 1

A study involving 50 patients from Toronto Western Hospital (Toronto, Canada) with a diagnosis of post-concussion syndrome (3 months to 1 year since diagnosis) within the ages of 18 and 65 will be taking place in 2016.

Concussion patients will be exposed to a reading task on an LCD computer screen and on a display screen incorporating features described, implemented with an e-paper display. Each subject will be asked to rate their baseline clinical symptoms using the Sport Concussion Assessment Tool 3 (SCAT3), read an excerpt on one of the screens until symptoms arise or 30 minutes have passed, rate their clinical symptoms again using the SCAT3, and fill out Version 1 of the comprehension test. On a subsequent visit (same time of day, same location), the subject will be asked to do the same tasks on the other screen (using Version 2 of the comprehension test). A subjective assessment questionnaire will be administered at the end of the study, which will provide qualitative data.

Example 2

A cross-over study involving 30 patients from Toronto Western Hospital (Toronto, Canada) with a diagnosis of post-concussion syndrome (PCS) and photosensitivity within the ages of 18 and 65 was conducted. Patients performed a reading task for a maximum of 30 minutes, followed by a comprehension test, using a generic LCD display screen and a custom-built non-LCD ("e-paper") display screen according to an embodiment of the invention (see Example 3 for details). The SCAT3 (Sport Concussion Assessment Tool—$3^{rd}$ edition; British Journal of Sports Medicine) was administered before and after each reading task. Symptom scores, reading time, and performance on the comprehension tests were compared between the two display devices. Additionally, patients completed a self-report questionnaire of their subjective experience.

Preliminary analysis was conducted for 20 of the patients. The LCD screen resulted ire significant worsening of symptom score (mean change=7.5; p=0.0001) and a significant number of symptoms were exacerbated (mean change=1.8; p=0.0056), which did not occur with the non-LCD screen. LCD screens significantly exacerbated seven of the SCAT3 symptoms. No significant difference was found in performance on the comprehension test or amount of words read. There was a trend towards an increased length of time of symptom-free reading with the non-LCD device (p=0.0636). Subjective reports suggested that the non-LCD experience was more favourable.

This study is the first to highlight clinical utility of non-LCD screens in the management of computer intolerance in patients with PCS. Further research is needed to characterize effects of non-LCD screens on computerized tasks. Work in this field can facilitate management strategies for return-to-work or return-to-school in concussed individuals.

Example 3

A custom e-paper display screen was built. The e-paper display screen includes features that allow it to render content received from a "host" device to which it is connected. The e-paper display includes features that reduce or eliminate one or more negative side effect experienced by users of generic LCD display screens recovering from post-concussion syndrome, or suffering from migraine or CVS.

Figure 2:
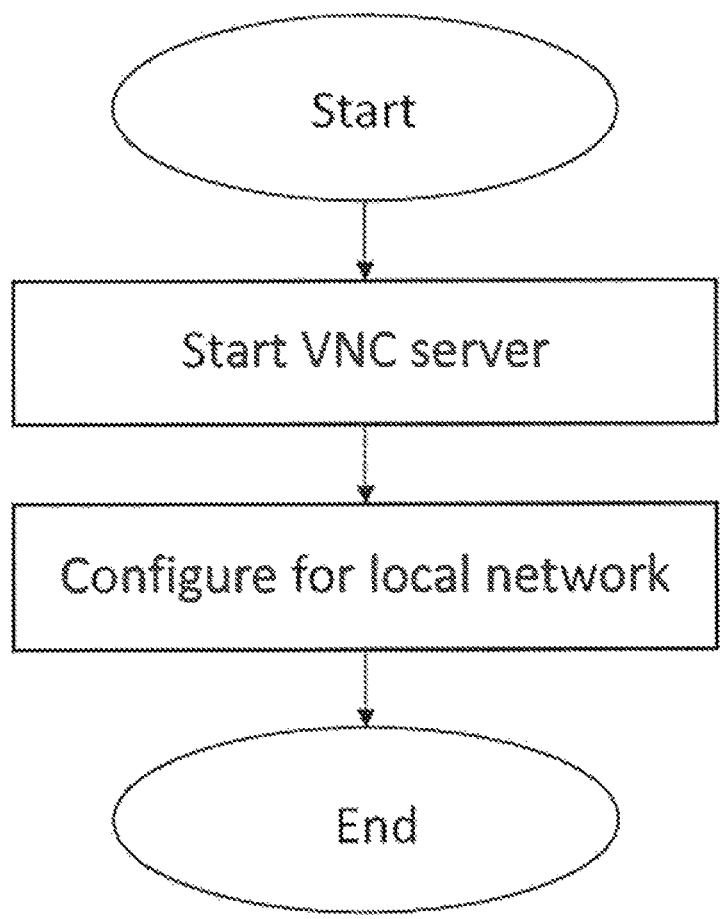
FIG. 2 is a flowchart showing steps of an algorithm executed by a processor of a host device to configure the device for connection to an e-paper display screen, according to one embodiment.

Referring to FIG. 1, the host device 10, such as a computer, sends image data from a processor 12 via an I/O port 14, such as USB, Ethernet, HDMI, VGA, GPIO, UART, etc., to the e-paper display device 20. This may include the processor 12 of the host device executing programmed instructions to configure the device for connection to the e-paper display screen. An example of a suitable algorithm is shown in the flowchart of FIG. 2.

Figure 3:
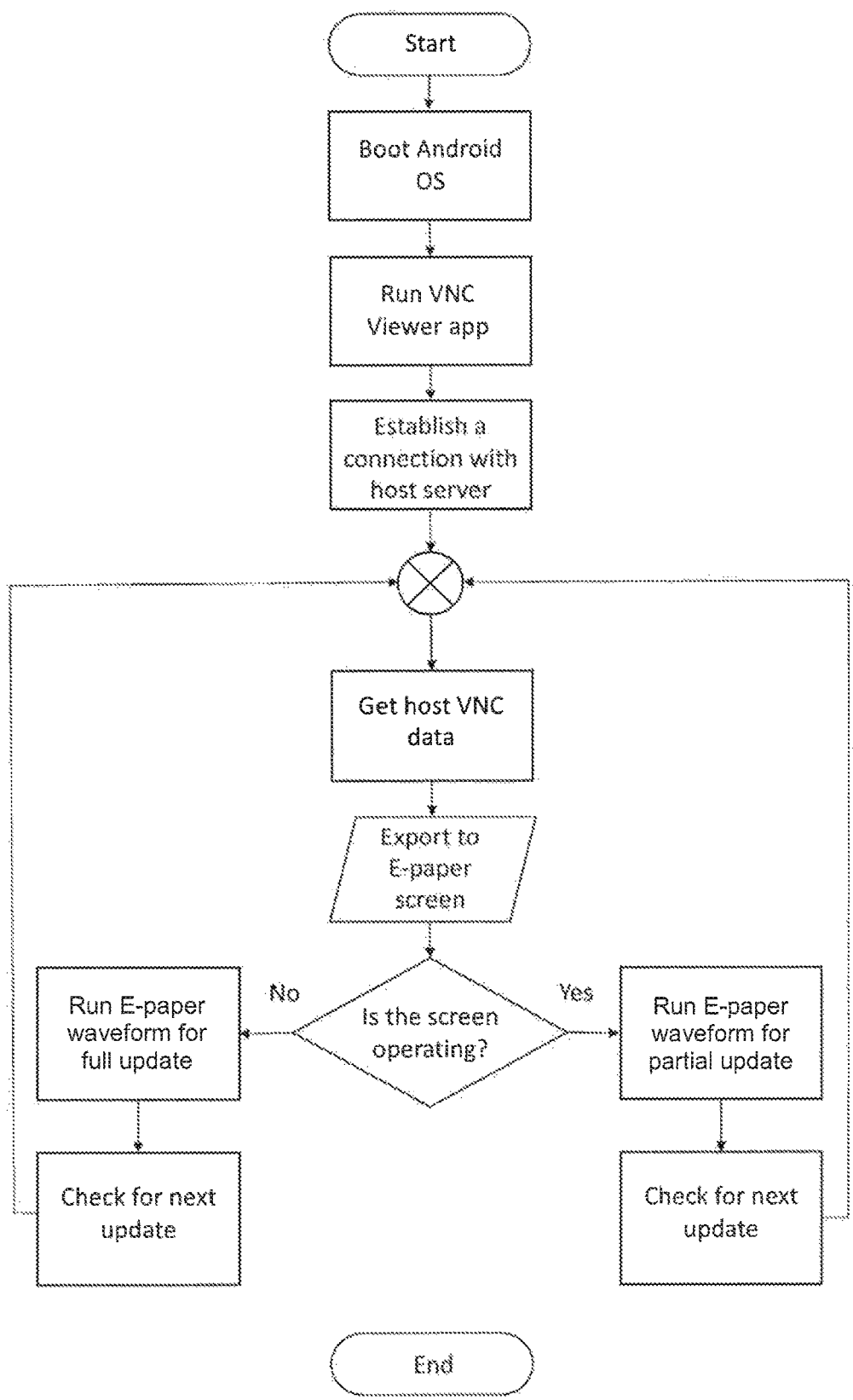
FIG. 3 is a flowchart showing steps of an algorithm executed by a processor of an e-paper display screen, according to one embodiment.

The e-paper display 20 includes a power supply 22, a processor 24 (e.g., available from NXP Semiconductors), which may include an electronic paper display (EPD) controller 24a. The image data received by the processor is not suitable for display on the e-paper screen. Accordingly, the processor 24 executes computer code (i.e., instructions) stored therein to modify the image data which is then sent to an e-paper screen interface 25 (e.g., IMXEBOOKDC4, available from NXP Semiconductors) which provides connection options to the e-paper screen 28. FIG. 3 is a flowchart showing steps of an algorithm executed by the processor 24 of the e-paper display screen, according to one embodiment. A custom reconfiguration cable is attached to the interface and carries signals between the interface 25 and a RA e-paper adapter board 26 (available from E Ink Corporation). An e-paper display screen 28 (e.g., a 13.3 inch display screen, model ED133UT2, available from E Ink Corporation) is then connected to the RA e-paper adapter board 26. The custom reconfiguration cable allows the connections between the IMXEBOOKDC4 and the RA adapter to be rearranged. This is done to deliver the proper signals to drive the e-paper screen. The e-paper screen requires specific signals to be delivered to certain pins of a connecting cable. The reconfiguration cable matches each pin on the e-paper screen to the required output pin on the IMXEBOOKDC4. This was required because the pin configuration varies among different models and sizes of e-paper screens.

In this example the processor was running an Android operating system. Other operating systems, such as Ubuntu, may also be used. As shown in FIGS. 2 and 3, a virtual network computing (VNC) client viewer program was installed and executed on the processor of the e-paper display, and a corresponding VNC server program was installed and executed on the host device. This allowed the e-paper display to view the display output of the host device, and the host device to export content to the e-paper display.

The computer code may be customized to allow control of various parameters of the content displayed on the e-paper screen, such as font size, as well as refresh rate of the e-paper screen (e.g., up to about 15 to 20 times per second).

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

REFERENCES

Amy, C. G. (2013 Dec. 5). Fox 9 meteorologist Ian Leonard returning to work after concussion. *Saint Paul Pioneer Press*. Retrieved from: http://search.proquest.com/docview/1465561485?accountid=14771.
Barnett, B. P., et al. (2015) Vision concerns after mild traumatic brain injury. *Current Treatment Options in Neurology* 17(5).
Chang, T. T., et al., (2007). Critical flicker frequency and related symptoms in mild traumatic brain injury. *Brain Injury* 21(10):1055-1062.
Harmon, K., et al. (2013). American Medical Society for Sports Medicine position statement: concussion in sport. *British Journal of Sports Medicine* 47:15-26.
Patel, R., et al. (2011). Elevated coherent motion thresholds in mild traumatic brain injury. *Optometry* 82(5):284-289.
Schrupp, L., et al. (2009). Foveal versus eccentric retinal critical flicker frequency in mild traumatic brain injury. *Optometry* 80(11):642-650.
Tator, C. H. (2013). Concussions and their consequences: Current diagnosis, management and prevention. *Canadian Medical Association Journal* 185(11):975-979.
Wimalasundera, S. (2006). Computer vision syndrome. *Galle Medical Journal* 11(1): 25-29.

The invention claimed is:

1. A display screen for an electronic device, comprising:
a component that receives content to be displayed;
a processor that analyzes the content and:
modifies at least one parameter of the content by removing all colours so that the content is displayed on the display screen in a grey scale;
minimizes refreshing the display screen by determining whether fill or partial refreshing of the display screen is required;
implements partial refreshing by locally refreshing the display screen only where content has changed; and
operates at a refresh rate of less than 30 frames per second (FPS);
wherein the content that is displayed in the grey scale reduces, minimizes, or eliminates at least one negative side effect in a user viewing the display screen;
wherein the user suffers from or is recovering from a condition associated with the at least one negative side effect.

2. The display screen of claim 1, wherein the condition is selected from migraine, eyestrain, computer vision syndrome (CVS), concussion, and mild traumatic brain injury (MTBI).

3. The display screen of claim 1, wherein the component comprises a non-transitory computer readable storage medium storing computer executable programmed instructions;
wherein the programmed instructions direct the processor to analyze the content and to modify the at least one parameter of the content that is displayed, and to minimize refreshing of the display screen.

4. The display screen of claim 1, wherein the processor further analyzes the content and modifies at least one parameter so that content is displayed with enhanced contrast, without video or animation, in one font size, or in one font style, or a combination of two or more thereof.

5. The display screen of claim 4, wherein the processor implements a graphical user interface (GUI) on the display screen.

6. The display screen of claim 1, wherein the display screen comprises electronic paper (e-paper) technology.

7. The display screen of claim 1, wherein the electronic device is selected from a laptop computer, a desktop computer, a computer workstation, a personal electronic device, a personal digital assistant (PDA), a cell phone, and a gaming device.

8. A non-transitory computer readable storage medium storing computer executable programmed instructions that, when executed, direct a processor to modify at least one parameter of content that is displayed on a display screen of an electronic device;
wherein the processor is directed to perform one or more operations selected from receiving the content to be displayed, analyzing the content, detecting one or more properties of the content selected from colour, video information, text size, and text style, and modifying at least one of the one or more properties, including:
removing all colours so that the content is displayed on the display screen in a grey scale;
minimizing refreshing the display screen by determining whether full or partial refreshing of the display screen is required;
implementing partial refreshing by locally refreshing the display screen only where content has changed; and
controlling refreshing the display screen at a refresh rate of less than 30 frames second (FPS);
wherein the displayed content reduces, minimizes, or eliminates at least one negative side effect in a user suffering from or recovering from a condition associated with the at least one negative side effect.

9. The non-transitory computer readable storage medium of claim 8, wherein the condition is selected from migraine, eyestrain, computer vision syndrome (CVS), concussion, and mild traumatic brain injury (MTBI).

10. The non-transitory computer readable storage medium of claim 8, wherein the display screen comprises electronic paper (e-paper) technology.

11. The non-transitory computer readable storage medium of claim 8, wherein the content that is displayed on the display screen comprises a graphical user interface.

12. A method for displaying content on an electronic device, comprising:
   detecting one or more parameters of content to be displayed on a display screen of the electronic device;
   modifying at least one detected parameter of the content, including:
   removing all colours so that the content is displayed on the display screen in a grey scale;
   minimizing refreshing the display screen by determining whether full or partial refreshing of the display screen is required;
   implementing partial refreshing by locally refreshing the display screen only where content has changed; and
   controlling refreshing the display screen at a refresh rate of less than 30 frames per second (FPS);
   wherein the modifying at least one parameter of the content reduces, minimizes, or eliminates at least one negative side effect in a user viewing the display screen;
   wherein the user is suffering from or recovering from a condition associated with the at least one negative side effect.

13. The method of claim 12, wherein the condition is selected from migraine, eyestrain, computer vision syndrome (CVS), concussion, and mild traumatic brain injury (MTBI).

14. The method of claim 12, comprising modifying at least one parameter so that content is displayed with enhanced contrast, without video or animation, in one font size, or in one font style, or a combination of two or more thereof.

15. The method of claim 14, comprising displaying modified content on the display screen using a graphical user interface (GUI).

16. The method of claim 12, including using a display screen comprising electronic paper (e-paper) technology.

17. The method of claim 12, wherein the electronic device is selected from a laptop computer, a desktop computer, a computer workstation, a personal electronic device, a personal digital assistant (PDA), a cell phone, and a gaming device.

18. The method of claim 12, wherein the negative side effect that is reduced, minimized, or eliminated comprises one or more of cognitive fatigue, headache, migraine, eye fatigue, nausea, vomiting, photophobia, photosensitivity, dizziness, confusion, mental fatigue, physical fatigue, drowsiness, a vision problem, depression, anxiety, and irritability.

* * * * *